May 27, 1941.  E. SPAHN  2,243,226
ELECTRICITY METER
Filed July 11, 1938
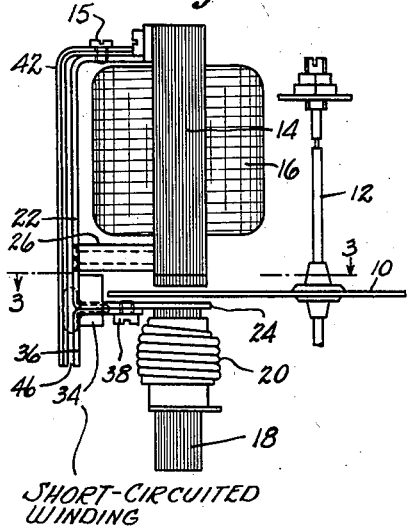
Fig. 1
SHORT-CIRCUITED WINDING
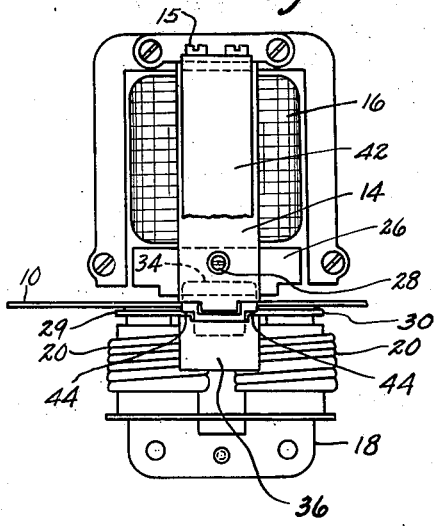
Fig. 2
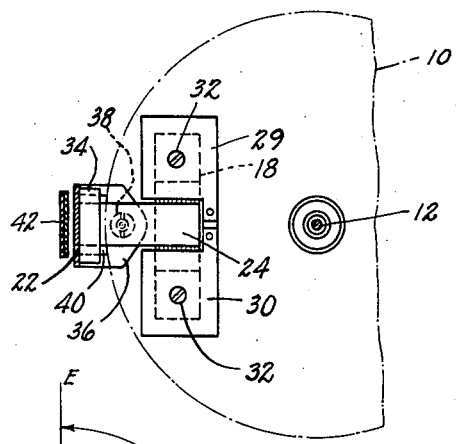
Fig. 3
Fig. 4
INVENTOR:
Emil Spahn
BY
Morgan Finnegan & Durham
ATTORNEYS.

Patented May 27, 1941

2,243,226

UNITED STATES PATENT OFFICE 2,243,226

ELECTRICITY METER

Emil Spahn, Zug, Switzerland, assignor to Landis & Gyr, A-G., Zug, Switzerland, a corporation of Switzerland Application July 11, 1938, Serial No. 218,568
In Switzerland July 20, 1937

5 Claims. (Cl. 171—264)

The invention relates to new and useful improvements in electricity meters of the Ferraris type, and more particularly to such improvements in temperature compensation means of unusual sensitiveness and accuracy.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serve to explain the principles of the invention.

Of the drawing:

Fig. 1 is a side elevation of a meter mechanism embodying the invention;

Fig. 2 is an elevation looking at Fig. 1 from the left;

Fig. 3 is a fragmentary horizontal section on line 3—3 of Fig. 1; and

Fig. 4 is a vector diagram.

It has been proposed to compensate Ferraris watt-hour meters by means of a short-circuited ring and a bimetallic element which alters the stray flux and voltage flux as variations in temperature occur. However, when the bimetal strip moves the short-circuited ring, more or less of the voltage flux passes through the ring and only the phase error is neutralized. Additional temperature compensating means must be provided with such an arrangement if the correction is to be made for an ohmic load. This correction may be accomplished by means of a piece of iron to be moved by a bimetallic strip lying in the stray flux of the short-circuited ring on the voltage magnet and also conducting a part of the by-pass or shunt flux. This kind of a compensation arrangement, however, requires a large movement of the bimetal strip as well as a relatively large amount of bimetal.

The present invention provides a novel and improved temperature compensated Ferraris meter in which the meter is compensated for temperature errors regardless of load conditions and which is relatively simple in construction and economical to manufacture.

The invention provides a temperature-compensated Ferraris meter, in which a bimetal strip is moved in accordance with variations of temperature to vary the stray flux of a short-circuited ring, through which the voltage driving flux passes. In accordance with the invention the above mentioned disadvantages of the prior art devices are avoided and the short-circuited ring has such a high inductance in proportion to its ohmic resistance that the measuring apparatus is not influenced by temperature for any kind of load.

In the illustrative embodiment of the invention, the bimetal strip and the short-circuited ring are arranged on the magnetic return member carrying the counter-pole and forming part of the metering system, and the return member and the bimetal strip are so formed that there is a shorter iron circuit or path for the stray flux of the short-circuited ring and large transition or polar surfaces bounding the air gap. For magnetically conducting the stray flux of the short-circuited ring there is preferably employed only a short piece of the said magnetic return member and of the bimetal strip.

The magnetic return member of the measuring system illustratively comprises an angularly bent end or counterpole bearing the short-circuited ring at the place where it is bent and also an angle piece of sheet iron connected to the end. In an arrangement of this kind the surfaces of the said magnetic return member lying opposite to the bimetal strip are advantageously at least as broad as the bimetal strip.

Referring now in detail to the illustrative embodiment shown in the accompanying drawing, the invention is applied to a Ferraris meter with a magnetic return member bearing the counterpole.

The meter includes the meter disc 10 rotatably mounted by shaft 12, the voltage core 14 and winding 16, the current core 18 and winding 20 which are of substantially conventional construction.

A magnetic return member 22 is bent at its end at right angles to form the counterpole 24 and is secured to the yoke 26 of voltage core 14 by means of screw 28. Counterpole 24 extends between the pole enlarging plates 29 and 30 which are of magnetic material and are secured to the upper ends of current pole pieces 18 by means of screws 32, and at its bend has secured to it a short circuited ring 34 and an angled piece of sheet iron 36 which is held fast by screw 38. The angle piece 36 has an aperture 40, through which extends the short-circuited ring 34. A bimetal strip 42 forming a good conductor is fixed at the upper part of the magnetic return member 22 by means of a screw 15.

The short-circuited ring 34 may be made somewhat narrower at its lower part where it extends through the aperture 40 of the angle piece 36, so that its edges 44 rest on the angle piece 36. Moreover the surfaces of the magnetic return member 22 and of the angle piece 12 are made somewhat broader than those of the bi-metal strip 42. The width of the part of the magnetic return member 22 forming the counterpole 24 is preferably made less than that of the remainder of the part 22. By such an arrangement of the short-circuited ring 34 and formation of the magnetic return member 22 a very advantageous short iron path for the stray flux of the short-circuited ring 34 is obtained. Also the air gap 46 between the magnetic return member 22 and the bi-metal strip 42 can be made comparatively large, so that an extremely uniform temperature compensation is obtained for different meters. By suitably proportioning this air gap 46 the range of temperature, within which the arrangement is to operate efficiently, can be varied within wide limits.

The effect of the temperature compensation will now be gone into more fully by the aid of the vector diagram, Figure 4. In this diagram $E$ represents the voltage, $i$ the current in the voltage coil, $i_{sch}$ the disc current, $i_K$, $i_{K1}$, $i_{K2}$ short circuit currents and $i_\mu$, $i_{\mu 1}$ $i_{\mu 2}$, $i_{\mu 3}$ magnetising currents for the voltage driving flux $\phi_E$, and $\beta$ the angle between the voltage and the magnetising current.

In order to compensate the temperature error of the meter with rising temperature, the voltage driving flux must decrease and the angle $\beta$ increase. This result is obtained when the alterations of the flux $\phi_E$, and of the phase angle $\beta$ only take place between the vector $i_{\mu 1}$ and $i_{\mu 2}$, that is to say within the arc of the semi-circle of the diagram corresponding to the phase angle $\Delta\beta$. Within this arc more especially the alterations are the most advantageous.

In all compensations heretofore known and effected by means of bi-metal strips however the action does not take place within this arc, since the reactance of the short-circuited ring is too small in comparison with the ohmic resistance. However, with the arrangement shown in Figures 1 to 3 there is obtained the necessary reactance of the short-circuited ring and its operation is within the desired arc.

The arc lying in front of the vector $i_{\mu 1}$ on the other hand causes only extremely small alterations of the phase angle, which are not sufficient, and the arc lying after the vector $i_{\mu 2}$ again leaves in the first part only very small alterations of flux and in the second part only small alterations of the phase angle. Furthermore also in the second arc there is produced a false alteration of the magnitude of the voltage flux. In these two arcs above mentioned ($i_\mu$ to $i_{\mu 1}$ and $i_{\mu 2}$ to $i_{\mu 3}$) therefore a satisfactory temperature compensation cannot be obtained. In the arc between the vector $i_{\mu 1}$ and $i_{\mu 2}$, on the other hand, both the alterations of the phase angle and also those of the magnetizing current, corresponding to variations of temperature, take place correctly.

The secondary currents induced by the voltage driving flux $\phi_E$ in the short-circuited ring 34 produce now a stray flux which, as shown in Figure 1 by the closed dotted line, is closed through the air gap 46 and parts of the magnetic return member 22 and of the bi-metal strip 42. The bi-metal strip 42 operates so that the air gap 46 increases with an increase of temperature and the reactance of the short-circuited ring 34 is thereby reduced. The short-circuit current increases to compensate the phase and magnitude errors of the driving flux to the desired degree. On lowering of the temperature the air gap 46 is reduced by means of the bi-metal strip 42 and the effect of the short-circuited ring 34 is opposite to what it was before. The bi-metal strip 42 will thus always vary the air gap 46 in accordance with variations of temperature so that a corresponding alteration of reactance of the short-circuited ring 34 takes place producing substantially perfect temperature compensation.

The invention in its broader aspects is not limited to the specific mechanisms shown and described but departures may be made therefrom within the scope of the accompanying claims without departing from the principles of the invention and without sacrificing its chief advantages.

What I claim is:

1. A temperature compensated Ferraris meter including voltage and current magnets, a meter disc, a counter-pole, a short-circuited ring encircling the counter-pole through which the voltage driving flux passes, a bimetal strip for altering the stray flux of the ring in accordance with changes in temperature, said counterpole being bent adjacent the disc and the short-circuited ring being located near the bend and the air gap between the bimetal strip and counterpole, and said ring having a high inductance relative to its ohmic resistance.

2. A temperature compensated Ferraris meter including in combination voltage and current magnets, a meter disc, a short-circuited ring through which the voltage driving flux passes, a bimetal strip for altering the stray flux of the ring in accordance with changes in temperature, said ring having a high inductance relative to its ohmic resistance, a magnetic return member supporting the ring, and the bimetal strip and return member being closely adjacent each other and providing an air gap therebetween with the short-circuited ring closely adjacent to the air gap.

3. A temperature compensating Ferraris meter including voltage and current magnets, a meter disc, a short-circuited ring through which the voltage driving flux passes, a bimetal strip for altering the stray flux of the ring in accordance with changes in temperature, said ring having a high inductance relative to its ohmic resistance, a magnetic return member supporting the ring, and the bimetal strip and return member being closely adjacent to each other, and an angle piece of sheet iron connected to the magnetic return member at the short-circuited ring.

4. A temperature compensated Ferraris meter including voltage and current magnets, a meter disc, a magnetic return member through which the voltage driving flux passes, a bimetal strip extending along and spaced slightly from the return member and adapted to move toward and away from the magnetic return member with changes in temperature, and a short circuited ring supported by the return member, attached to the return member and adjacent the air gap, said bimetal strip serving to alter the stray flux of the ring and pole enlarging members surrounding the end of the counterpole and attached to the pole pieces of the current magnets.

5. A temperature compensated Ferraris meter including voltage and current magnets, a meter disc, a magnetic return member through which the voltage driving flux passes, a bimetal strip extending along and spaced slightly from the return member and adapted to move toward and away from the magnetic return member with changes in temperature, and a short-circuited ring, said return member being bent and reduced in width to pass through the ring and an angle piece of sheet iron attached at the bend, whereby movement of the bimetal strip varies the stray flux of the ring.

EMIL SPAHN.